United States Patent
Ruiters et al.

(10) Patent No.: US 11,236,788 B2
(45) Date of Patent: Feb. 1, 2022

(54) ADJUSTING THE SYSTEM PRESSURE FOR A CLUTCH

(71) Applicant: GKN Automotive Ltd., Redditch (GB)

(72) Inventors: Volker Rene Ruiters, Siegburg (DE); Andreas Langhanki, Duisburg (DE); Rainer Brüning, Rheine (DE)

(73) Assignee: GKN Automotive, Redditch (GB)

( * ) Notice: Subject to any disclaimer, the term of this patent is extended or adjusted under 35 U.S.C. 154(b) by 120 days.

(21) Appl. No.: 16/475,795

(22) PCT Filed: Jan. 13, 2017

(86) PCT No.: PCT/EP2017/050651
§ 371 (c)(1),
(2) Date: Jul. 3, 2019

(87) PCT Pub. No.: WO2018/130293
PCT Pub. Date: Jul. 19, 2018

(65) Prior Publication Data
US 2021/0071723 A1    Mar. 11, 2021

(51) Int. Cl.
*F16H 1/46* (2006.01)
*B60K 17/16* (2006.01)
(Continued)

(52) U.S. Cl.
CPC ........... *F16D 48/066* (2013.01); *F16D 25/00* (2013.01); *F16D 28/00* (2013.01); *B60K 17/34* (2013.01);
(Continued)

(58) Field of Classification Search
CPC ...... F16D 48/06; F16D 48/062; F16D 48/066; F16D 2048/0245; F16D 2500/1024; F16D 2500/3022; B60W 10/30; B60W 10/023
See application file for complete search history.

(56) References Cited

U.S. PATENT DOCUMENTS

2004/0061603 A1* 4/2004 Mack ..................... F16D 48/06
340/453
2012/0159939 A1   6/2012 Xie
(Continued)

FOREIGN PATENT DOCUMENTS

CN          102537328 A      7/2012
CN          103423334 A      12/2013
(Continued)

OTHER PUBLICATIONS

CN Office Action for Application No. 201780088404.2 dated Jul. 7, 2020 (6 pages; no English translation available).
(Continued)

*Primary Examiner* — Charles A Fox
*Assistant Examiner* — Farhana Pervin
(74) *Attorney, Agent, or Firm* — Bejin Bieneman PLC

(57) ABSTRACT

Setting a system pressure for a hydraulically actuated clutch comprises a) Providing a system comprising a pump drivable by an electrically operated motor controlled by a control unit that senses a motor current and rotational speed and a system temperature is determined;

b) a characteristic diagram is provided specifying values for at least the motor current and rotational speed for different system operating points;

c) Accessing the characteristic diagram while operating a vehicle;

d) Sensing at least the motor current and rotational speed at at least a first operating point and determining the system temperature;

(Continued)

e) Comparing the values, acquired in step d) for the current and speed with the values for the current and rotational speed from the characteristic diagram according to step b);

f) Adapting the characteristic diagram for the system on the basis of the parameters determined in step d).

8 Claims, 2 Drawing Sheets

(51) Int. Cl.
  *F16D 48/06* (2006.01)
  *F16D 25/00* (2006.01)
  *F16D 28/00* (2006.01)
  *B60K 17/34* (2006.01)

(52) U.S. Cl.
  CPC ............... *F16D 2500/1024* (2013.01); *F16D 2500/3022* (2013.01)

(56) References Cited

U.S. PATENT DOCUMENTS

| | | | |
|---|---|---|---|
| 2013/0018605 A1 | 1/2013 | Peterson | |
| 2017/0023075 A1* | 1/2017 | Nozu | ................... B60K 17/35 |
| 2017/0282920 A1* | 10/2017 | Ortseifen | .............. B60W 10/06 |
| 2018/0099563 A1* | 4/2018 | Nozu | ..................... F16D 11/14 |

FOREIGN PATENT DOCUMENTS

| | | | |
|---|---|---|---|
| CN | 105090478 A | 11/2015 | |
| DE | 10 2013 008 740 A1 | 11/2014 | |
| DE | 10 2015 107628 A1 | 11/2015 | |
| EP | 1253341 A2 | 10/2002 | |
| WO | WO-2014164408 A1 * | 10/2014 | ............. F16D 48/02 |

OTHER PUBLICATIONS

International Search Report and Written Opinion for PCT/EP2017/050651 dated Sep. 19, 2017 (12 pages; with English translation).
German Office Action dated Oct. 7, 2021 for Application No. DE 11 2017 006 809.6 (9 pages; with English machine translation).

* cited by examiner

ADJUSTING THE SYSTEM PRESSURE FOR A CLUTCH

CROSS-REFERENCE TO RELATED APPLICATIONS

This application is a national stage of, and claims priority to, Patent Cooperation Treaty Application No. PCT/EP2017/050651, filed on Jan. 13, 2017, which application is hereby incorporated herein by reference in its entirety.

BACKGROUND

The basic design of hydraulically actuated clutches and systems for operating such clutches is known. Multi-plate clutches are also known in which external plates are connected in a rotationally fixed fashion to a plate external carrier, and internal plates are connected in a rotationally fixed fashion to a plate internal carrier, and each plate carrier is connected in a rotationally fixed fashion to the drive shaft or the output shaft. Owing to application of a closing force (owing to the system pressure) which acts in an axial direction, the plates are placed in contact with one another so that a torque can be transmitted from the drive shaft to the output shaft via the clutch.

In this context, such a system can comprise a pump for feeding a hydraulic fluid, an electrically operated motor for driving the pump and a control unit for operating and controlling the motor. An actuator for opening and closing the clutch is actuated by means of the fluid. The pump generates a system pressure which e.g. actuates an actuator directly or is connected to the actuator via a valve or the like. The torque which is to be transmitted by the clutch is set by means of the system pressure (booster), and the control quality of the pressure downstream of the valve depends on the system pressure offset, wherein the system pressure then indirectly influences the torque to be transmitted by the clutch. In the embodiment as a booster an orifice is connected in parallel with the piston so that the system pressure acts on the piston but can also be reduced via the orifice.

Any inaccuracy in the system pressure can therefore also give rise to a fault in terms of the transmitted torque. During the intermediate connection, e.g. of a valve between the system pressure and the actuator, a defined system pressure offset should be set in order to compensate for inaccuracies or fluctuations during the operation of the clutch. An excessively high system pressure can be compensated by the valve with certain faults (for example the valve leakage depends on the system pressure level and the system pressure offset and there is crosstalk of the system pressure offset on the pressure downstream of the valve), but an excessively low system pressure cannot be compensated. An excessively high system pressure can, however, additionally load the involved components, so that the service life of at least the system can be reduced. On the other hand, the thermal loading on the system increases and said loading can in an extreme case also cause the system to fail.

The parameters, which are to be set and which can be measured, of the (electrical) motor current and motor rotational speed of the pump motor, as well as the oil/motor temperature which can be measured/estimated, are available for setting the system pressure and estimating the system pressure which is set. In this context, the motor current can be sensed, e.g., by the control unit, and the motor rotational speed can be sensed by means of a rotational speed sensor. In order to set the correct system pressure, the parameters of the motor current and motor rotational speed must be determined and set as accurately as possible. In this context, it is necessary to bear in mind that a relationship between the system pressure and the parameters of the motor current/motor rotational speed/temperature is influenced by a multiplicity of further parameters, e.g., by friction and by operating-point-dependent efficiency losses in the pump and/or in the motor.

SUMMARY

The present disclosure relates to a method for setting a system pressure for a hydraulically actuated clutch (HCA—hydraulic clutch actuator), in particular for a multi-plate clutch, preferably for a clutch which is arranged on a side shaft of a motor vehicle, so that by closing the clutch the entire axle (here the hydraulically actuated clutch is referred to as a booster) or also just one wheel (here the hydraulically actuated clutch is referred to as a twinster) of the motor vehicle is connected in a torque-transmitting fashion to a drive unit of the motor vehicle.

The disclosed method provides more accurate setting and/or adaptation of the system pressure is also achieved improving the service life of the clutch.

The features set forth in the claims are specified and explained in more detail in the description, wherein further preferred embodiments of the invention will be illustrated. Further, advantageous embodiments of the shaft connection are set forth in the independent and dependent claims. It is to be pointed out that the features individually listed in the dependent claims can be combined with one another in a technologically expedient manner and define further embodiments.

A method for setting a system pressure for a hydraulically actuated clutch at least comprises the following steps:

a) Providing a system, at least comprising a pump for feeding a hydraulic fluid, an electrically operated motor for driving the pump and a control unit for operating and controlling the motor; wherein at least one motor current and one motor rotational speed of the motor are sensed by the control unit; wherein a temperature within the system is calculated or measured;

b) Providing a characteristic diagram for the system; wherein the characteristic diagram specifies values for at least the motor current and the motor rotational speed for different operating points (in particular for a first operating point, preferably for all relevant operating points) of the system;

c) Operating the system in a motor vehicle, wherein the control unit accesses the characteristic diagram;

d) Sensing at least the (actual) motor current and the (actual) motor rotational speed of the motor at at least a first operating point during the operation of the system and calculating or measuring the temperature within the system;

e) Comparing the values, acquired in step d), for the (actual) motor current and (actual) motor rotational speed with the values for the (setpoint) motor current and (setpoint) motor rotational speed from the characteristic diagram according to step b);

f) Adapting the characteristic diagram for the system on the basis of the parameters determined in step d).

The above (non-limiting) division of the method steps into a) to f) is intended to serve mainly only for the purpose of explanation and does not necessarily impose a sequence and/or dependence. The frequency of the method steps, e.g., during the setting up and/or the operation of the system, can also vary. Likewise, it is possible that method steps are at least to a certain extent superimposed on one another in terms of timing. The method steps d) to f) take place during step c). Step f) can be conditional and, if appropriate, can be executed only when step e) supplies an unexpected or intolerable result.

Setting of the system pressure takes place exclusively using the data determined in the system. Measured values or the like which are not generated on the basis of the specified system are not to be taken into account here. In this context, the system pressure can be transmitted to one or more actuators directly or via one or more valves, wherein a clutch is closed (in order to transmit torques) or opened (no transmission of torques) by movement of an actuator (e.g. a piston).

On the one hand, the (setpoint) motor current and/or the (setpoint) motor rotational speed are controlled by means of the control unit of the system. Furthermore, the (actual) motor current and the (actual) motor rotational speed are sensed, e.g., by means of measurement (by sensor). In particular, the motor rotational speed is sensed by means of a known rotational speed sensor. In particular, the motor current, e.g. a three-phase current is determined only by measuring a phase and performing subsequent averaging. All three phases are preferably measured.

A temperature within the system is, for example, (1) a temperature of the fluid at a specific position in the system, e.g., in a reservoir and/or a sump or the average temperature of the fluid in the system; and/or (2) a temperature of the motor and/or (3) a temperature of the pump; and/or (4) a temperature of the control unit. These temperatures can be calculated on an up to date basis and/or measured at at least one location. If appropriate, temperatures at another location and/or temperatures of further components can also be calculated or estimated from a temperature measurement at a specific location in the system.

In particular, the characteristic diagram which is provided according to step b) is determined during operation of the system in a test device (that is to say independently of the vehicle or before said system is set up in the vehicle). The characteristic diagram can be used for other systems of the same design. This can mean that a characteristic diagram which applies to all systems of the same design is provided by means of a test device.

In step c) a system which is of a specific design and for which a characteristic diagram has been determined, and which is stored in the control unit of the system which is installed in the motor vehicle, is operated together with the motor vehicle. For this purpose, the system can be initially installed with the "basic configuration" in the motor vehicle. It is proposed that during the (subsequent) operation of the motor vehicle, the system is monitored by the control unit, wherein changes or deviations which occur in comparison with the originally provided characteristic diagram are detected according to step e), and in step f) are used to adapt or (permanently) overwrite the originally provided characteristic diagram (at least at the currently considered operating point), so that a "vehicle-specific configuration" is generated.

In this context, it is to be borne in mind that a new system (not yet installed in the motor vehicle) has different, to be precise, higher, frictional losses than a system which is already in use. Such changes in the frictional losses influence the system pressure which is to be provided by the system. Therefore, for a specific system pressure in the case of low frictional losses a lower motor current is necessary than in the case of higher frictional losses. Furthermore, as a result of the increased friction and as a result of the higher motor current which is provided, the temperature within the system also rises. Such frictional losses occur at all the moving parts, that is to say at the pump and at the motor.

The measurement or sensing of the motor current and/or motor rotational speed takes place by reference to at least one predetermined state of the system. The system pressure is increased until a minimum torque is transmitted by the clutch (the so-called "kiss point" or the contact point of the clutch). The necessary (actual) values which have been set for the parameters of the motor current and motor rotational speed in order to reach this predetermined state can be compared with the (setpoint) values, stored in the characteristic diagram, according to step e). If deviations of a specific order of magnitude (e.g. above a specified tolerance) occur, the characteristic diagram is adapted according to step f).

The first operating point can comprise starting the motor from a motor rotational speed of zero revolution per minute ($0^1$/min). The characteristic diagram is adapted by reference to the detected deviations in the first operating point. When starting the motor from a stationary state of the motor, currently present frictional states in the system can be tested and detected.

In step b) at least one (possibly all) of the following parameters is taken into account for each operating point (in particular for the first operating point):

i. Loss of commutation as a function of the motor rotational speed;
ii. Efficiency of motor as a function of the motor rotational speed;
iii. Efficiency of motor as a function of the temperature of the motor;
iv. Efficiency of pump as a function of the motor rotational speed;
v. Efficiency of pump as a function of the temperature of the pump;
vi. Current measuring error of the control unit as a function of the motor rotational speed; and
vii. Current measuring error of the control unit as a function of the temperature of a control unit.

The characteristic diagram comprises individual parameters and preferably all of the parameters specified above. In this way the respective necessary (setpoint) motor current and the necessary (setpoint) motor rotational speed can be read out for each system pressure which is provided. In the characteristic diagram the changing viscosity of the fluid is also taken into account as a function of the temperature of the fluid. In this context, e.g. the leakage, dependent on the viscosity, of the fluid within the system is preferably also taken into account.

In particular, the system pressure is a pressure of the fluid which is generated by the pump, in the hydraulic circuit which, is assigned to the system, wherein an actuator (e.g. a piston) of a clutch can be actuated by means of the system pressure and by means of the fluid.

According to one example of the method, the steps d) and e) are carried out at least to a certain extent exclusively in order to adapt (or check) the characteristic diagram (according to step f)) and/or not to actuate the clutch. In particular, the steps d) to f) are therefore carried out when the clutch is in a non-actuated state (that is to say open) and when actuation of the clutch is not foreseen within the scope of the operation of the motor vehicle. The steps d) to f) are therefore initiated and carried out by the control unit (automatically) and not by a driver's request. Therefore, the system can be checked continuously and can be provided in an optimum state for the next actuation of the clutch.

In the steps d) to f) the contact point/kiss point of the clutch is approached starting from an open clutch, wherein this process runs unnoticed, by a driver of the motor vehicle.

Steps d) to f) can be are carried out periodically, that is to say in a cyclically repeating fashion. In this context, the periods can be constant or variable in a predefined fashion.

A period is determined as a function of at least one of the following parameters: time, operating duration of the system, specific stressing of the system (e.g. previous loading of the motor, the pump and/or of a valve, ageing of the fluid, etc.).

According to one example of the method, an axle (booster) of the motor vehicle can be connected in a torque-transmitting fashion to a drive unit of the motor vehicle by actuating the clutch, or by actuating two clutches two wheels (twinster) (of one axle) of the motor vehicle can be connected independently of one another in a torque-transmitting fashion to a drive unit of the motor vehicle. In particular, the clutch/clutches is/are arranged on one side shaft/two side shafts of a motor vehicle.

The clutch is a multi-plate clutch in which external plates are connected in a rotationally fixed fashion to a plate external carrier, and internal plates are connected in a rotationally fixed fashion to a plate internal carrier, and each plate carrier is connected in a rotationally fixed fashion to a component of the following group of the drive shaft and output shaft. Owing to application of a closing force which acts in an axial direction (owing to the system pressure), the plates are placed in contact with one another in such a way that a torque is transmitted from the drive shaft to the output shaft via the clutch.

Furthermore, a motor vehicle can at least have a drive unit, a clutch and a system which has at least one pump for feeding a hydraulic fluid, an electrically operated motor for driving the pump and a control unit for operating and controlling the motor; wherein the clutch is arranged on a side shaft of the motor vehicle in order to transmit torques so that by closing the clutch only one wheel of the motor vehicle can be connected in a torque-transmitting fashion to the drive unit of the motor vehicle, wherein the system is configured to be operated with the proposed method.

The (multi-plate) clutch is arranged on a side shaft of a motor vehicle in order to transmit torques so that by closing the multi-plate clutch an axle of the motor vehicle is connected to a drive unit of the motor vehicle in a torque-transmitting fashion. The multi-plate clutch is therefore not a clutch of a motor vehicle which is arranged between the drive unit and a shiftable transmission of the motor vehicle. Such multi-plate clutches which are arranged on the side shafts (often) have to process sudden changes in a setpoint torque which has to be metered accurately, so that continuous adaptation of the characteristic diagram is particularly advantageous here.

BRIEF SUMMARY OF THE DRAWINGS

The invention and the technical field are explained in more detail below with reference to the figures. It is to be noted that the invention is not intended to be limited by the exemplary embodiments which are shown. In particular, unless explicitly stated otherwise, it is also possible to extract partial aspects of the contents which are explained in the figures and to combine them with other components and realizations from the present description and/or figures. Identical reference symbols denote identical subject matters, so that, where appropriate, explanations from other figures can be used in a supplementary fashion. In the drawing in a schematic view.

DESCRIPTION

Figure 1:
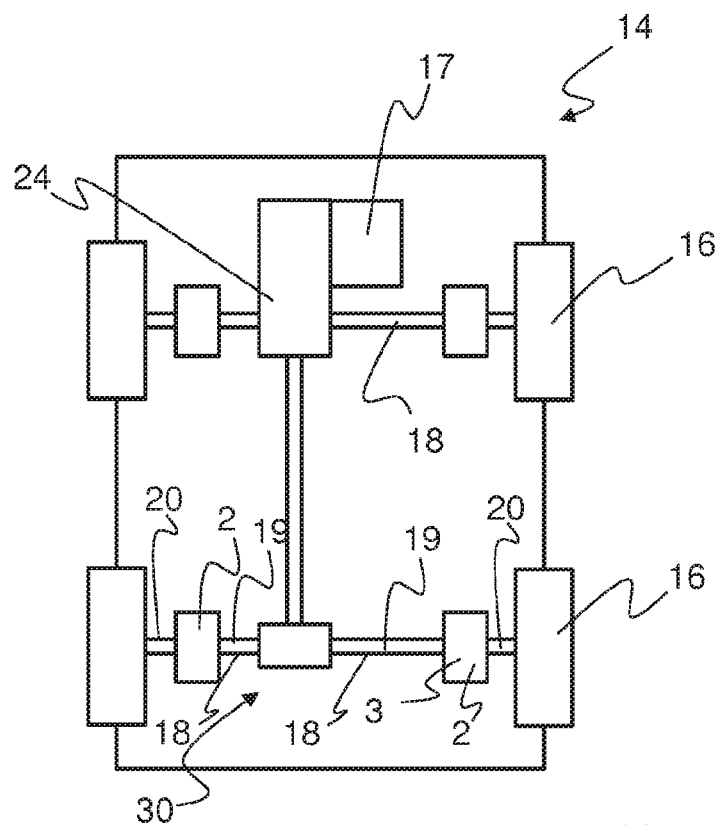
FIG. 1 shows a motor vehicle with a system for driving in each case one wheel of the motor vehicle.

FIG. 1 shows a motor vehicle 14 with a drive unit 17 and a system 3 as well as two clutches 2 which are each arranged on a side shaft 18 of an axle 30 of the motor vehicle 14 in order to transmit torques, so that by closing the clutches 2 in each case an output shaft 20 of the motor vehicle 14 can be connected in a torque-transmitting fashion (twinster) to the drive unit 17 of the motor vehicle 14. The drive unit 17 is connected to the side shaft 18 via a transmission 24. Each side shaft 18 comprises a drive shaft 19 and an output shaft 20 which can be connected to one another in a torque-transmitting fashion via the clutch 2. The drive shafts 19 are connected to one another here via a helical-cut crown gear, so that the drive shafts 19 are driven with the same rotational speed in each case. A rotational speed difference between the drive shafts 20 is made possible by means of the clutches 2.

Figure 2:
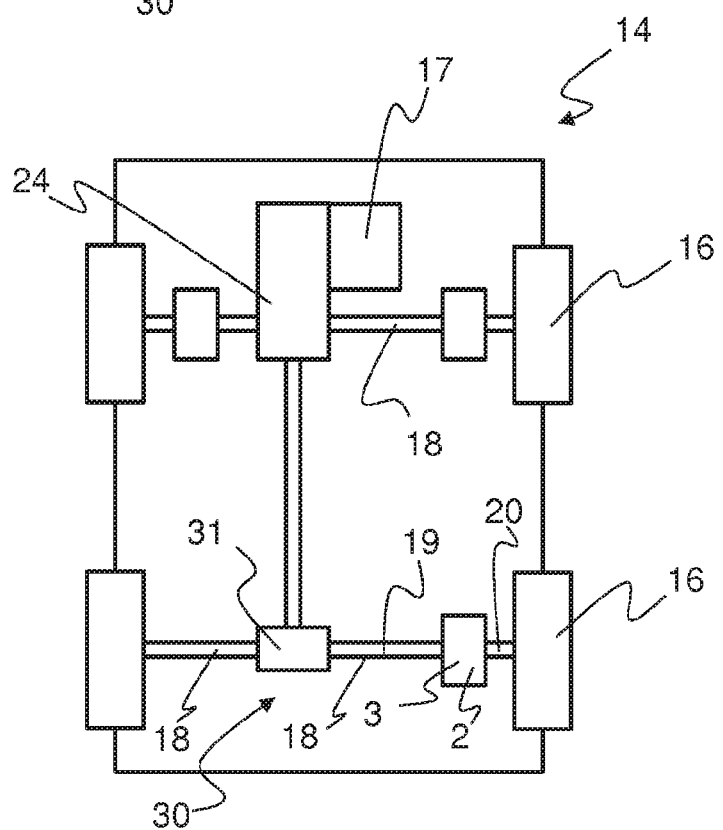
FIG. 2 shows a motor vehicle with a system for driving an axle of the motor vehicle.

FIG. 2 shows a motor vehicle 14 with a drive unit 17 and a system 3 as well as a clutch 2 which is arranged on a side shaft 18 of an axle 30 of the motor vehicle 14 in order to transmit torques, so that by closing the clutch 2 a drive shaft 20 of the motor vehicle 14 can be connected in a torque-transmitting fashion (booster) to the drive unit 17 of the motor vehicle 14. The drive unit 17 is connected to the axle 30 and the side shafts 18 via a transmission 24. The axle 30 comprises a differential 31, two drive shafts 19 and an output shaft 20, wherein the one drive shaft 19 can be connected in a torque-transmitting fashion to the output shaft 20 via the clutch 2. The drive shafts 19 are connected to one another here via an open differential 31 so that the drive shafts 19 can have different rotational speeds.

Figure 3:
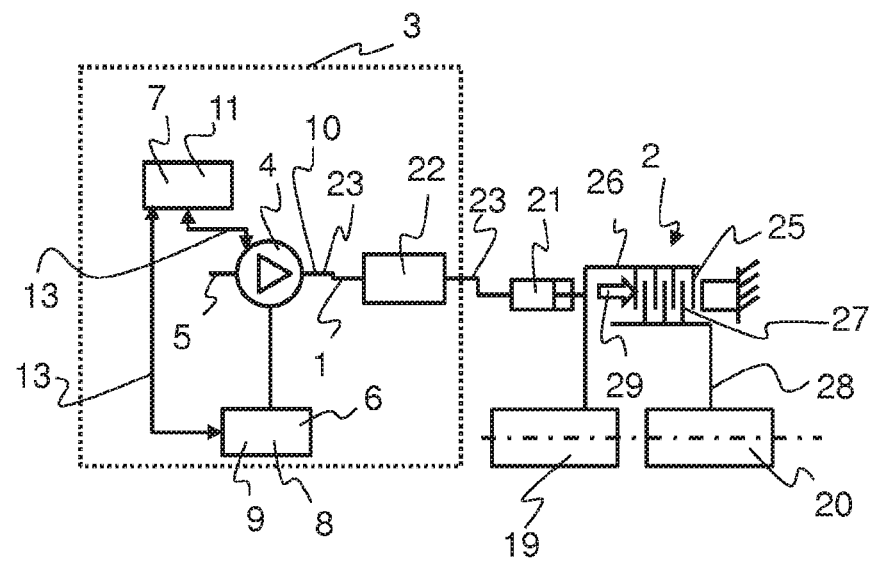
FIG. 3 shows an arrangement of a multi-plate clutch on a side shaft, wherein the multi-plate clutch is actuated hydraulically.

FIG. 3 shows an arrangement of a (multi-plate) clutch 2 on a side shaft 18, wherein the (multi-plate) clutch 2 is actuated hydraulically. In the case of the (multi-plate) clutch 2, external plates 25 are connected in a rotationally fixed fashion to a plate external carrier 26, and internal plates 27 are connected in a rotationally fixed fashion to a plate internal carrier 28. Each plate carrier 26, 28 is connected in a rotationally fixed fashion to a component of the group of the drive shaft 19 and output shaft 20. The (multi-plate) clutch 2 has a rotational axis and is arranged coaxially with respect to the drive shaft 19 and output shaft 20. The plates 25, 27 of the (multi-plate) clutch 2 extend in the circumferential direction about the rotational axis and are connected in a rotationally fixed fashion to plate carriers 26, 28. Owing to application of a closing force 29 which acts in an axial direction, the plates 25, 27 are placed in contact with one another, so that a torque can be transmitted from the drive shaft 19 to the output shaft 20 via the (multi-plate) clutch 2.

Here, the (multi-plate) clutch 2 is actuated hydraulically, wherein the closing force 29 which acts in the axial direction is generated by an actuator 21 which is embodied as a piston, wherein the actuator 21 is connected to the pump 4 of the system 3 via a valve 22. When there is a torque request, the valve 22 and the pump 4 are actuated by means of a control unit 7 setting the requested system pressure 1 upstream of the valve 22 and for setting a pressure for actuating the actuator 21 downstream of the valve.

The setting of the system pressure 1 is carried out by means of the system 3 which comprises the pump 4 for feeding a hydraulic fluid 5, the electrically operated motor 6 for driving the pump 4 and a control unit for operating and controlling the motor 6. A motor current 8 and a motor rotational speed 9 of the motor 6 are sensed by means of the control unit 7. A temperature 10 (here e.g. of the fluid 5) inside the system 3 is calculated or measured. From the measurement at one location the temperatures 10 at another location can be calculated or estimated, or the temperatures 10 of further components can be calculated or estimated.

As described above, the system pressure 1 is not transmitted to an actuator 21 directly but rather via a valve 22, wherein as a result of a movement of the actuator 21 (here a piston) the clutch 2 is closed (in order to transmit torques) or opened (no transmission of torques).

On the one hand the (setpoint) motor current 8 and/or the (setpoint) motor rotational speed 9 are controlled by means of the control unit 7 of the system 3. Furthermore, the (actual) motor current 8 and the (actual) motor rotational speed 9 are sensed, e.g., by means of a measurement.

In FIG. 3, according to step c) a system 3 which is of a specific design and for which a characteristic diagram 11 has been determined and which is stored in the control unit 7 of the system 3 is operated together with the motor vehicle 14. In this context, the system 3 is monitored by the control unit 7 during the operation of the motor vehicle 14, wherein changes or deviations which occur in comparison with the originally provided characteristic diagram 11 are detected according to step e), and in step f) are used to overwrite the originally provided characteristic diagram 11.

Figure 4:
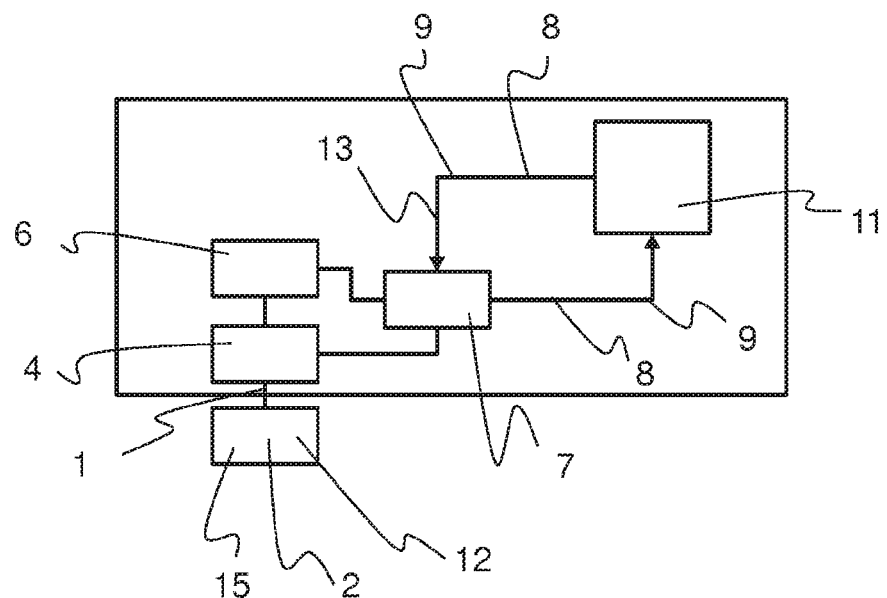
FIG. 4 shows a system with a clutch.

FIG. 4 shows a system 3 with a clutch 2. Here, the clutch 2 is connected directly to the pump 4. The system pressure 1 acts directly on the clutch 2 here. The measurement or sensing of the motor current 8 and motor rotational speed 9 takes place with reference to at least one predetermined state. For this purpose, the system pressure 1 is increased until a minimum torque is transmitted by the clutch 2 (so-called kiss point or contact point of the clutch). The (actual) values 13, which are necessary and set in order to reach this predetermined state, of the parameters of the motor current 8 and motor rotational speed 9 can be compared with the (setpoint) values 13, stored in the characteristic diagram 11, according to step e). If deviations of a specific order of magnitude occur, the characteristic diagram 11 is adapted according to step f).

The steps d) to f) are initiated and carried out by means of the control unit 7 and not by means of a driver's request. Therefore, the system 3 can be checked continuously and can be provided in an optimum state for the next actuation of the clutch 2.

In the steps d) to f), the contact point/kiss point of the clutch 2 is approached starting from an open clutch 2, wherein this process runs unnoticed by a driver of the motor vehicle 14 or passes to a time which is agreed with the operating strategy.

LIST OF REFERENCE NUMBERS

1 System pressure
2 Clutch
3 System
4 Pump
5 Fluid
6 Motor
7 Control unit
8 Motor current
9 Motor rotational speed
10 Temperature
11 Characteristic diagram
12 Operating point
13 Value
14 Motor vehicle
15 First operating point
16 Wheel
17 Drive unit
18 Side shaft
19 Drive shaft
20 Output shaft
21 Actuator
22 Valve
23 Line
24 Transmission
25 External plates
26 External plate carrier
27 Internal plates
28 Internal plate carrier
29 Closing force
30 Axle
31 Differential

The invention claimed is:

1. A method for setting a system pressure for a hydraulically actuated clutch, comprising:
   a) providing a system that includes a pump for feeding a hydraulic fluid, an electrically operated motor for driving the pump, and a control unit for operating and controlling the motor; wherein at least one motor current and one motor rotational speed are sensed by the control unit; wherein a temperature within the system is calculated or measured;
   b) providing a characteristic diagram for the system; wherein the characteristic diagram specifies values for at least the motor current and the motor rotational speed for different operating points of the system;
   c) operating the system in a motor vehicle, wherein the control unit accesses the characteristic diagram;
   d) sensing at least the motor current and motor rotational speed of the motor at at least a first operating point during the operation of the system and calculating or measuring the temperature within the system;
   e) comparing the values, acquired in step d) for the motor current and motor rotational speed with the values for the motor current and motor rotational speed from the characteristic diagram according to step b); and
   f) adapting the characteristic diagram for the system on the basis of the parameters determined in step d);

wherein in step b) at least one of the following parameters is taken into account for each of the operating points:
   i. current measuring error of the control unit as a function of the motor rotational speed; and
   ii. current measuring error of the control unit as a function of the temperature of the control unit;

wherein setting of the system pressure takes place exclusively using data determined in the system;
wherein the steps d) and f) are carried out periodically;
wherein a period between carrying out the steps d) and f) is variable and determined as a function of at least one of the following parameters: time, operating duration, specific stressing of the system; and wherein the first operating point comprises starting the motor from a motor rotational speed of zero revolutions per minute.

2. The method of claim 1, wherein in step b) all of the following parameters are taken into account for each of the operating points:
  i. loss of commutation as a function of the motor rotational speed;
  ii. efficiency of motor as a function of the motor rotational speed;
  iii. efficiency of motor as a function of the temperature of the motor;
  iv. efficiency of pump as a function of the motor rotational speed;
  v. efficiency of pump as a function of the temperature of the pump;
  vi. the current measuring error of the control unit as a function of the motor rotational speed; and
  vii. the current measuring error of the control unit as a function of the temperature of the control unit.

3. The method of claim 1, wherein the system pressure is a pressure of the fluid generated by the pump, wherein an actuator of a clutch can be actuated by the system pressure and by the fluid.

4. The method of claim 1, wherein the steps d) and e) are carried out exclusively to adapt the characteristic diagram and not to actuate the clutch.

5. The method of claim 1, wherein an axle of the motor vehicle can be connected in a torque-transmitting fashion to a drive unit of the motor vehicle by actuating the clutch.

6. The method of claim 1, wherein the clutch is a multi-plate clutch.

7. A motor vehicle, at least having a drive unit, a clutch and a system which has at least one pump for feeding a hydraulic fluid, an electrically operated motor for driving the pump and a control unit for operating and controlling the motor; wherein the clutch is arranged on a side shaft of the motor vehicle in order to transmit torques so that by closing the clutch an axle of the motor vehicle can be connected in a torque-transmitting fashion to the drive unit of the motor vehicle, wherein the system is operated by
  a) providing a characteristic diagram for the system; wherein the characteristic diagram specifies values for at least the motor current and the motor rotational speed for different operating points of the system;
  b) operating the system in a motor vehicle, wherein the control unit accesses the characteristic diagram;
  c) sensing at least the motor current and motor rotational speed of the motor at at least a first operating point during the operation of the system and calculating or measuring the temperature within the system;
  d) comparing the values, acquired in step c) for the motor current and motor rotational speed with the values for the motor current and motor rotational speed from the characteristic diagram according to step a); and
  e) adapting the characteristic diagram for the system on the basis of the parameters determined in step a);

wherein in step a) at least one of the following parameters is taken into account for each of the operating points:
  i. current measuring error of the control unit as a function of the motor rotational speed; and
  ii. current measuring error of the control unit as a function of the temperature of the control unit; and wherein setting of the system pressure takes place exclusively using data determined in the system;

wherein the steps d) and f) are carried out periodically;

wherein a period between carrying out the steps d) and f) is variable and determined as a function of at least one of the following parameters: time, operating duration, specific stressing of the system; and wherein the first operating point comprises starting the motor from a motor rotational speed of zero revolutions per minute.

8. The method of claim 1, wherein the first operating point comprises increasing the system pressure until a minimum torque is transmitted by the clutch.

\* \* \* \* \*